United States Patent Office 2,902,590
Patented Sept. 1, 1959

2,902,590
METHOD OF MAKING COMPOSITE FUEL ELEMENTS

Robert A. Noland, Chicago, and Cecil C. Stone, Downers Grove, Ill., assignors to the United States of America as represented by the United States Atomic Energy Commission No Drawing. Application March 14, 1958
Serial No. 721,610

6 Claims. (Cl. 219—118)

This invention relates to a method of preparing a composite fuel blanket element for a nuclear reactor.

Fast breeder nuclear reactors, such as the reactor disclosed in application Serial No. 437,017, filed June 15, 1954, now Patent No. 2,841,545, employ fuel elements including a central fuel section and upper and lower blanket sections. These fuel elements may take the form of the fuel elements disclosed in that patent application or they may take the form of an integral uranium rod clad in a corrosion-resistant material such as zirconium or a zirconium-base alloy known as Zircalloy-2. Zircalloy-2 is an alloy of zirconium containing 1.5% tin, 0.12% iron, 0.10% chromium, and 0.05% nickel. The fuel elements include a central fuel section in which the uranium is of a relatively high degree of enrichment, upper and lower blanket sections in which the uranium is of a relatively low degree of enrichment, and end caps of the same material as the cladding.

In more detail, therefore, the invention relates to a method of joining the sections of a composite fuel blanket element for a fast breeder nuclear reactor.

Uranium may now be clad in zirconium or Zircalloy-2 by conventional techniques such as coextrusion. A long rod is obtained thereby which is cut to length and joined to other sections of the fuel element.

Difficulty is found in applying conventional welding techniques to this operation because uranium is much lower melting than is zirconium. If a conventional welding technique is employed, there is a strong possibility that the uranium will not be completely sealed within the cladding at the weld because the uranium will melt and seep out between the ends being welded together.

It is accordingly the object of our invention to join sections of a composite fuel-blanket element for a nuclear reactor in a bond which is as strong as the individual sections thereof while insuring that the uranium is completely sealed in the fuel element by the cladding.

In order to accomplish this result we preferentially etch the end of the sections to be joined to lower the level of the uranium therein below that of the cladding and then weld the joint while applying axial pressure to the joint to fuse the cladding to a uniform depth. The joint is then subjected to induction heating to diffusion bond the interior of the element.

Construction of one specific fuel-blanket element according to the present invention will next be described. Fuel stock is prepared from Zircalloy-2 clad uranium-2 weight percent zirconium rod by coextrusion and swaging. The uranium is enriched in uranium [235] to 92%. The rod is reduced to a diameter of .407–.408 inch by the reduction operation. Blanket stock is prepared from Zircalloy-2 clad natural uranium-2 weight percent zirconium rod by coextrusion and swaging. This rod is also reduced to a diameter of .407–.408 inch by the coextrusion and swaging operation. In both cases the cladding is about 20 mils in thickness after reduction.

A fuel element comprising a central section 8½ inches long cut from the above-described fuel stock, an upper blanket section 7¾ inches long and a lower blanket section 3%6 inches long cut from the above-described blanket stock, and upper and lower end caps of Zircalloy-2 may be prepared by joining the individual sections of the composite element by the method of our invention.

The first step is to etch the uranium in both ends of both fuel and blanket sections to a depth on the order of ⅒₀ mil thereby lowering the level of uranium slightly below that of the cladding. This may be done by electroetching using a solution of 50% by volume-70% nitric acid but is preferably done by electro-polishing using an acetic-perchloric acid bath.

A thin disc of zirconium of the same diameter as the stock is then inserted between a fuel section and a blanket section and the sections are brought together. Thickness of the disc may be about 10 mils. The purpose of the disc is to separate the enriched from unenriched uranium.

Axial pressure is then applied to the joint. Sufficient pressure may be applied by manual means. The joint is then heli-arc welded to fuse the cladding to a uniform depth of approximately half its thickness.

The arc is applied twice to the same weld. The first time the piece is rotated 480° with a current of 23 amperes applied to the arc. The second time the piece is again rotated 480° starting from the same position as before with a current of 15 amperes applied to the arc. In each case the current is tapered off to eliminate formation of a crater.

The weld is made by rotating the piece at a variable speed to compensate for heat developed therein by the welding operation. At the start of rotation the piece is rotated at 5 r.p.m. while at the end of 360° the piece is rotated at 15 r.p.m. This procedure assures fusion to a uniform depth all the way around the weld.

Etching the uranium prior to the welding operation provides a rim of cladding about the uranium. When pressure is applied to the joint, a solid phase bond by diffusion is formed below the fusion bond. The combination of etching and applying pressure assure that the cladding completely seals the uranium in the fuel element as the uranium cannot seep out through the joint before the bond is complete.

The bond is then completed by induction heating the joint for about 4½ seconds to just melt the uranium. This forms a bond at the center of the fuel element.

An end cap of Zircalloy-2 is then bonded to the ends of the fuel-blanket element by substantially the same procedure. The end cap and the end, which has already been etched, are brought together and axial pressure is applied. The joint is heli-arc welded to fuse the cladding to a uniform depth of approximately half its thickness.

In this welding operation the joint is preheated by the arc for 1½ seconds with a current of 13 amperes being supplied to the arc, the joint is then rotated 480° with a current of 17 amperes to the arc and again for 480° with a current of 13 amperes supplied to the arc. As before the current is tapered off each time to eliminate crater formation and the speed of rotation of the piece is varied between 5 r.p.m. at the start of rotation and 15 r.p.m. at the end of rotation for each application of the arc.

The interior of the joint is then diffusion bonded by induction heating the joint for about 6½ seconds to just melt the uranium.

It will be understood that this invention is not to be limited to the details given herein but that it may be modified within the scope of the appended claims.

What is claimed is:

1. A method of preparing a composite fuel-blanket element for a nuclear reactor comprising providing a central fuel section consisting of a Zircalloy-clad rod of highly enriched uranium, upper and lower blanket sections consisting if a Zircalloy-clad rod of natural uranium, and upper and lower Zircalloy end caps, joining said central fuel section to said upper and lower blanket sections by preferentially etching the uranium in the ends of the sections to be joined to a depth on the order of $\frac{1}{10}$ mil, placing a thin disc of zirconium between the ends to be joined, applying axial pressure to the joint, heli-arc welding the joint to fuse the cladding to a uniform depth of about 50% of the thickness of the cladding, and heating the joint by induction heating to form a diffusion bond between the zirconium disc and the uranium, and joining the other ends of the blanket sections to the end caps by preferentially etching the uranium in the ends of the blanket sections to a depth on the order of $\frac{1}{10}$ mil, applying axial pressure to the joint, heli-arc welding the joint to fuse the cladding to the cap to a uniform depth of about 50% of the thickness of the cladding, and heating the joint by induction heating to form a diffusion bond between the uranium and the end cap.

2. A method of joining sections of uranium rod clad in a corrosion-resistant material of higher melting point than the uranium comprising preferentially etching the uranium in the ends of the sections to be joined to depress the level of the uranium slightly below that of the cladding, bringing the ends to be joined together, applying axial pressure to the joint, and heli-arc welding the joint while rotating the joint to fuse the cladding to a uniform depth of about 50% of the thickness of the cladding.

3. A method according to claim 2 in which a thin disc of the same material as the cladding is inserted between the sections to be joined.

4. A method according to claim 2 in which a uniform depth of fusion in the welding operation is obtained by varying the speed of rotation of the joined sections to compensate for heat developed therein by the welding operation.

5. A method of capping the ends of a fuel element for a nuclear reactor in which the fuel element comprises a uranium rod clad in Zircalloy-2 and the end cap is Zircalloy-2 comprising preferentially etching the uranium in the end of the fuel element to depress the level of the uranium slightly below that of the cladding, bringing the end cap and the end of the fuel element together, applying axial pressure to the joint, and heli-arc welding the joint while rotating the joint to fuse the cladding to the end cap to a depth of about 50% of the thickness of the cladding.

6. A method according to claim 5 in which a uniform depth of fusion in the welding operation is obtained by varying the speed of rotation of the joint to compensate for the heat developed therein by the welding operations.

References Cited in the file of this patent

UNITED STATES PATENTS

| | | |
|---|---|---|
| 2,642,965 | Danhier | June 23, 1953 |
| 2,649,529 | Smith et al. | Aug. 18, 1953 |
| 2,719,354 | Dalin | Oct. 4, 1955 |
| 2,737,567 | Bahnes et al. | Mar. 6, 1956 |
| 2,815,436 | Bland | Dec. 3, 1957 |